United States Patent [19]
Hatwar et al.

[11] Patent Number: 5,436,072
[45] Date of Patent: * Jul. 25, 1995

[54] MULTILAYER MAGNETOOPTIC RECORDING MEDIA

[75] Inventors: Tukaram K. Hatwar, Penfield; Yuan-Sheng Tyan, Webster, both of N.Y.

[73] Assignee: Eastman Kodak Company, Rochester, N.Y.

[*] Notice: The portion of the term of this patent subsequent to Feb. 27, 2007 has been disclaimed.

[21] Appl. No.: 209,933

[22] Filed: Mar. 11, 1994

[51] Int. Cl.$^6$ ............................................. G11B 5/66
[52] U.S. Cl. .................... 478/336; 428/694 ML; 428/694 MM; 428/694 XS; 428/701; 428/611; 428/668; 428/670; 369/13
[58] Field of Search ............... 428/694 ML, 694 MM, 428/694 DE, 694 XS, 701, 702, 900, 336, 611, 656, 668, 670, 675; 369/13

[56] References Cited

U.S. PATENT DOCUMENTS

| | | | |
|---|---|---|---|
| 5,082,749 | 1/1992 | Carcia | 428/694 |
| 5,100,700 | 3/1992 | Ide et al. | 428/64 |

FOREIGN PATENT DOCUMENTS

| | | |
|---|---|---|
| 0304873 | 3/1989 | European Pat. Off. . |
| 0304927 | 3/1989 | European Pat. Off. . |

OTHER PUBLICATIONS

Sumi et al "Reliability of Pt/Co MO-Disk with a Simple Structure" MORIS '92; p. 42. (Dec. 1992).
"Dielectric Enhancement Layers for a Co/Pt Multilayer Magnetooptic Recording Medium", Carcia et al, Appl. Phys Lett. 59 (1991), pp. 191-193.

*Primary Examiner*—Paul J. Thibodeau
*Assistant Examiner*—R. Follett
*Attorney, Agent, or Firm*—Raymond L. Owens

[57] ABSTRACT

A magnetooptic medium which includes a substrate, an amorphous seed layer of ZnSnO, and a recording multilayer layer. The recording multilayer includes alternating layers of cobalt/platinum or cobalt/palladium or mixtures thereof.

7 Claims, 6 Drawing Sheets

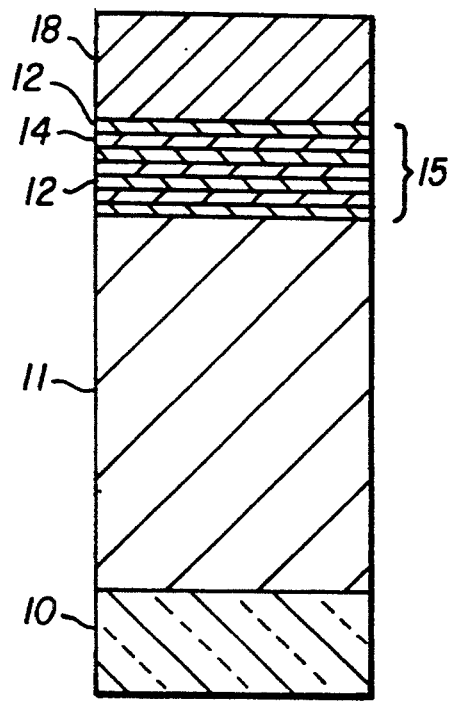
FIG. IA
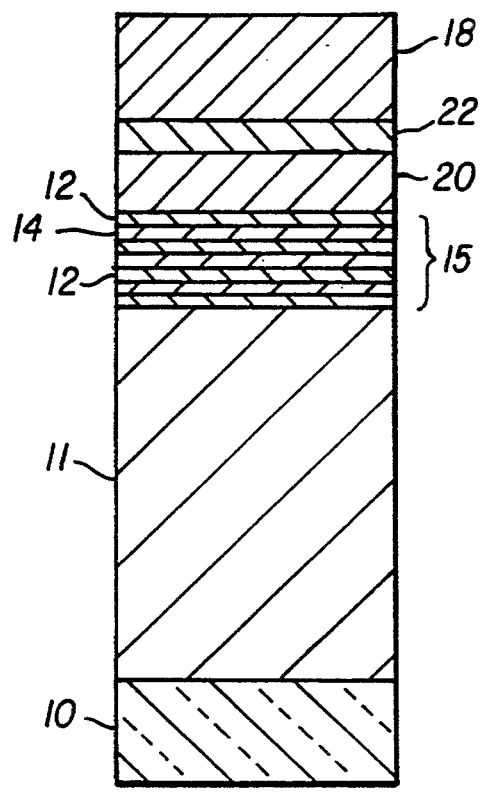
FIG. IB
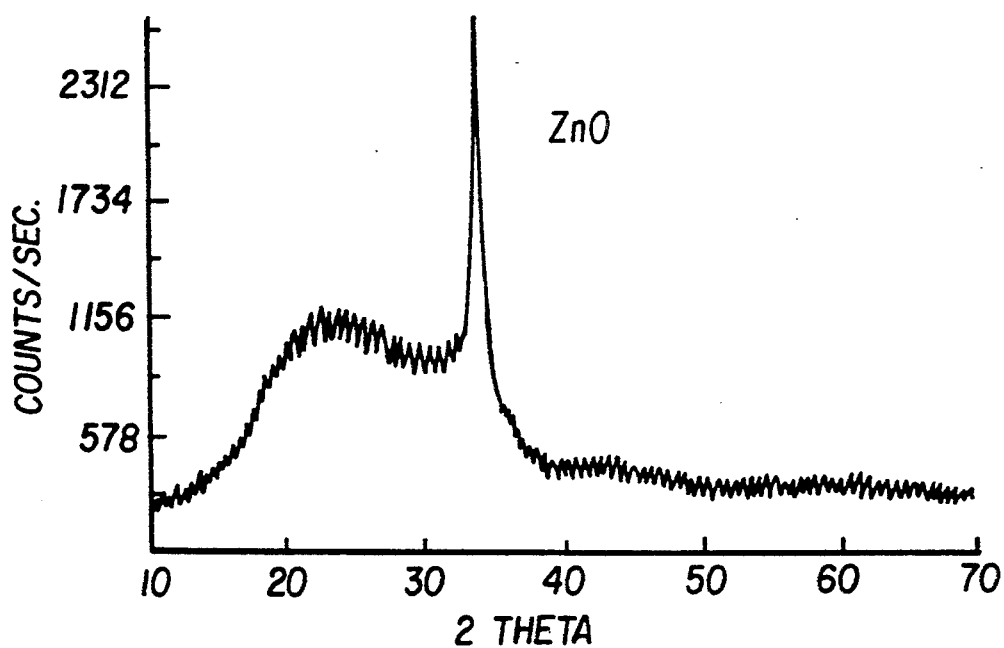
FIG. 2A

MULTILAYER MAGNETOOPTIC RECORDING MEDIA

CROSS REFERENCE TO RELATED APPLICATIONS

Reference is made to commonly assigned U.S. patent application Ser. No. 076,604, pending, to Tukaram K. Hatwar, Yuan-Sheng Tyan, Anthony C. Palumbo, and Charles F. Brucker, filed Jun. 14, 1993 and U.S. patent application Ser. No. 076,326, pending, to Charles F. Brucker, Tukaram K. Hatwar, and Yuan-Sheng Tyan, filed Jun. 14, 1993, the disclosures of which are incorporated by reference herein.

FIELD OF THE INVENTION

This invention relates to magnetooptical (MO) recording media having a cobalt/platinum (Co/Pt) or cobalt/palladium (Co/Pd) multilayered structure.

BACKGROUND OF THE INVENTION

Co/Pt multilayers have been used for MO recording media. These materials have perpendicular magnetic anisotropy, large Kerr rotation at short wavelength and excellent environmental stability. However, these materials when deposited by conventional sputtering processes possess low coercivity. Attempts have been made to increase the coercivity by controlling the Co/Pt ratio, using seed layers of metals and dielectrics, and etching the substrate before depositing the multilayer (see Magnetooptic Recording Medium, European Patent Application 0304873 (1988)); Perpendicular Magnetic Recording Media, European Patent Application 0304927 (1989); U.S. Pat. No. 5,082,749; and "Dielectric Enhancement Layers for a Co/Pt Multilayer Magnetooptic Recording Medium", Carcia et al, Appl. Phys Lett. 58 (1991), pages 191-193. For high Co/Pt ratio, even though coercivity up to 1000 Oe can be obtained, the hysteresis loops are not square. For through substrate recording, the use of a metal seed layer is objectionable since it attenuates the Kerr rotation, decreases the figure of merit and decreases the recording sensitivity. Some of the dielectrics such as oxides and nitrides of Zn, In, Al, Ta, Mg, Si, Sn, Fe, Zr, Bi metals increase the coercivity but the thickness of these layers is usually recommended to be more than 100 nm for sufficient enhancement. This also increases the deposition time and lowers the production throughput. Further, the crystalline size of the material is directly proportional to the thickness of the layer. Large crystalline size in thick seed layers may give rise to the noise during the recording process.

Furthermore, most oxides and nitrides are difficult to deposit using simple non-reactive dc sputtering at high deposition rate. The low deposition rate and the large structure thickness require long deposition time, result in low production throughput, induce thermal damage to the sensitive substrate such as PC and gives rise to mechanical stresses causing deformation of the structure. In extreme cases cracking and delamination of the structure may occur.

In the above-identified U.S. patent application Ser. Nos. 076,604, pending, an amorphous seed layer is used which has a thickness of less than 20 nm. In U.S. Ser. No. 076,326, pending, a polycrystalline seed layer is disclosed. Both of these seed layer structures provide a number of advantages.

SUMMARY OF THE INVENTION

It is therefore an object of the present invention to provide an improved magneto optic media structure having a Co/Pt multilayer but with increased coercivity and squareness and manufacturing throughput. This invention provides a solution to problems mentioned above by using a seed layer made of amorphous zinc-tin-oxide. These materials have been found quite unexpectedly to provide a significant improvement in coercivity and squareness and general performance of the MO disk.

The above object is achieved by a MO recording medium comprising a substrate, a seed layer of amorphous $Zn_{1-x}Sn_xO_{1+x}$ wherein $x=0.15$ to $0.75$, and a recording multilayer of alternate layers of cobalt and platinum or cobalt and palladium alloy deposited onto the said seed layer, wherein the said seed layer is selected to improve the coercivity and squareness of the recording multilayer.

The following are advantages of magnetooptic media made in accordance with this invention:

a) these seed layers enhance the coercivity and squareness of the Kerr hysteresis loop;

b) these seed layers reduce the writing noise, increase the carrier and hence the general performance of the MO structure;

c) ultra-thin layers of zinc-tin-oxide ($<20$ nm) provide large increases in coercivity;

d) the thinness of the layers allows less deposition time; this reduces the thermal damage to the sensitive substrate and the mechanical stresses of the structure;

e) the small thickness of the seed layers permits an improved production throughput during manufacturing; and f) magnetooptic structures made in accordance with this invention are particularly suitable for applications using short wavelength lasers.

BRIEF DESCRIPTION OF THE DRAWINGS

FIGS. 1A and 1B show a magnetic recording structure including a seed layer in accordance with the invention;

FIGS. 2A-D show a series of x-ray diffraction patterns of zinc oxide and zinc-tin-oxide with different percentages of tin oxide;

DETAILED DESCRIPTION OF THE INVENTION

Figure 2B:
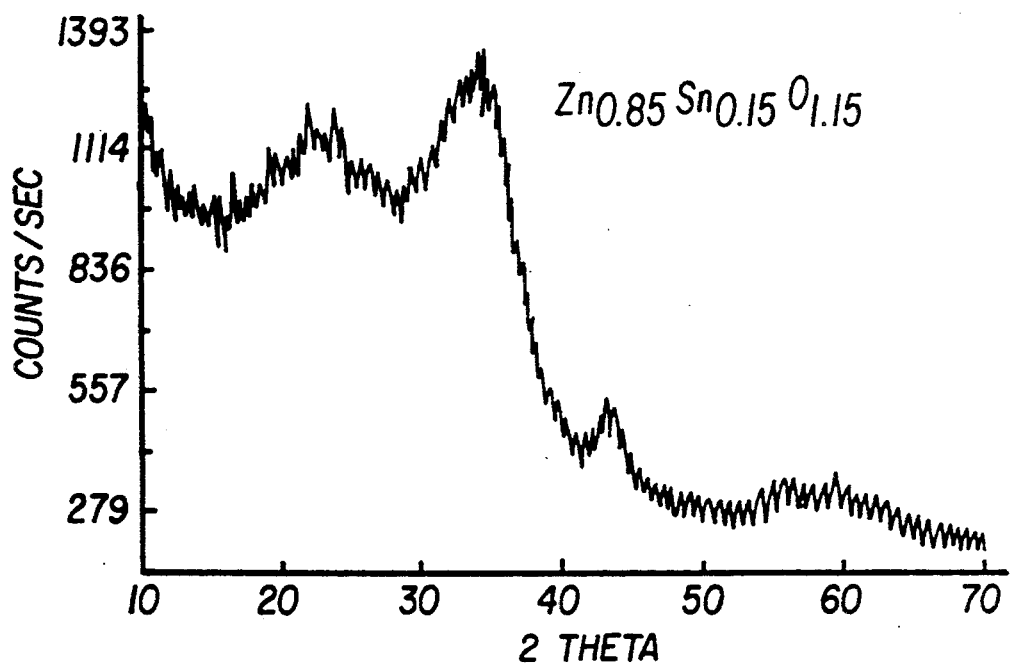

Turning first to FIG. 1A, a schematic shows a structure in accordance with the invention. The device includes a substrate 10 which is made of polycarbonate and a seed layer 11 made of zinc-tin-oxide. It will be understood that this seed layer can have various combinations of zinc, tin and oxygen and still operate in accordance with the invention. On the seed layer 11 is deposited a multilayer recording element 15 having alternating bilayers of Pt layer 12 and Co layer 14. The substrate 10 can be made of glass or polycarbonate. Generally the substrate is transparent as light from a laser or other source will illuminate a recording multilayer structure through the substrate. The Pt layers typically having a range of from 0.4–2 nm and the Co layers have a thickness of 0.2-0.8 nm. The thickness of the seed layer can be selected to be relatively thin or thick.

FIG. 1B shows an alternate structure in accordance with the invention which is similar to FIG. 1A, where layers correspond, they will carry the same number. The difference in FIG. 1B from FIG. 1A is that dielectric layer 20 is formed on the mulitlayer structure 15 and a reflective metal layer 22 is formed on the dielectric layer. The UV curable lacquer layer overcoat layer 18 is formed directly on the metal layer 22. The metal layer 22 can be formed of, for example, a reflective material such as of aluminum, gold, silver, copper or platinum can be disposed directly on the dielectric layer 20.

The UV curable lacquer layer 18 is scratch resistant and maintains structural integrity of the media. The dielectric layer can be provided directly on the multilayer recording structure. This layer may be selected Co be the same material as the seed layer or some other material. Its function is to thermally insulate the lacquer layer from the recording multilayer. It also can be selected to provide an optical enhancement function if the media is illuminated by light passing through it (front surface recording). These structures are particularly suitable for use in magnetooptic disk, compact disk (CD) and photo compact disk (Photo CD). Alternatively, a double-sided construction can be utilized wherein two substrates coated with seed layers and the cobalt/platinum multilayers are laminated together using adhesives. Yet another alternative is to form an air-sandwich structure while a small air gap is maintained between them. Alternatively, a blank disk can be used in an air-sandwich structure with a magnetooptical recording medium in accordance with the invention. Magnetooptical recording medium structures in accordance with this invention can be provided in the form of a disk which can be used in a cartridge.

With this type of structure, incident laser light illuminates a particular portion of the substrate, passes through the substrate, and interacts with the multilayered structure changing the Kerr rotation.

MAKING MO STRUCTURES

Figure 2C:
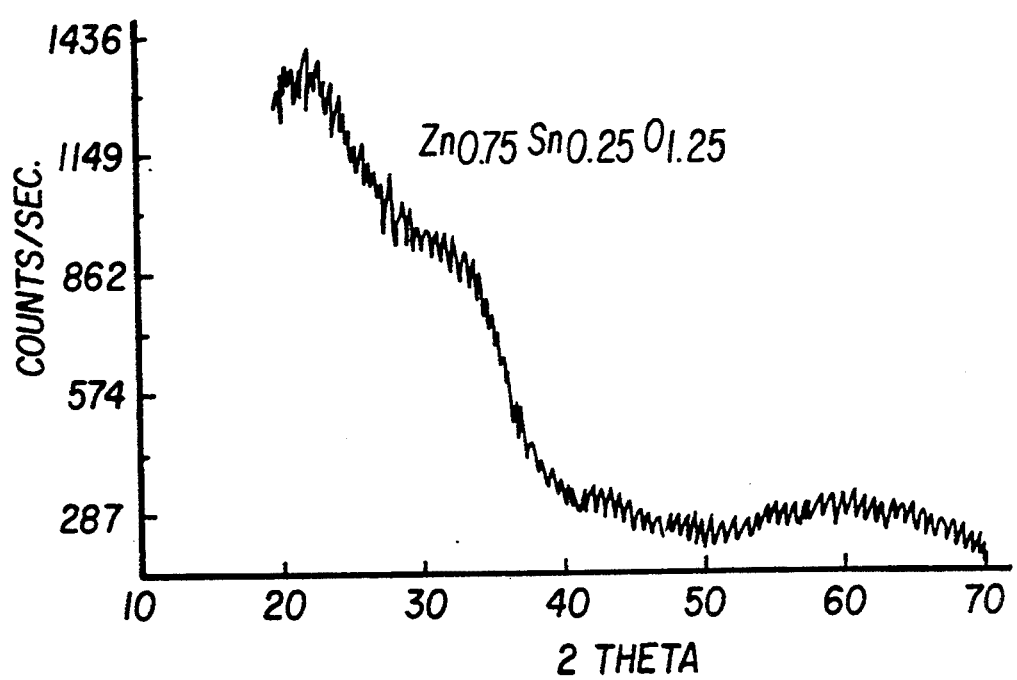
Figure 2D:
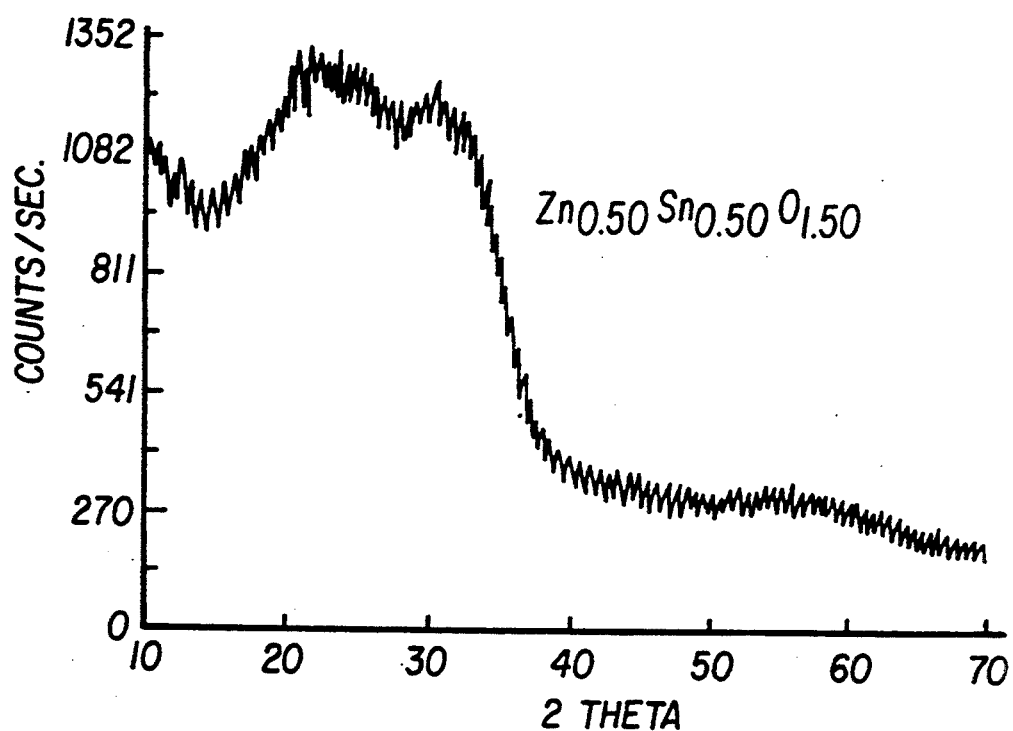

Thin structures of ZnSnO were prepared by d.c. sputtering a homogenous electrically conducting targets in Ar, Kr, Ar+$O_2$ or Kr+$O_2$ atmosphere. When these thicknesses are less than 100 nm, the seed layers are optically transparent in the 300-900 nm wavelength region. As shown in FIG. 2A, ZnO alone is a highly crystalline structure. However, as shown in FIGS. 2B, 2C and 2D, when more than 15% atomic of tin is added to zinc oxide, the structure becomes amorphous.

The Co/Pt multilayers were prepared by d.c. sputtering Co and Pt targets in Ar, Kr or Xe atmosphere. The base pressure before depositing the structures was about $1.2 \times 10^{-6}$ Torr and deposition pressure was about 5-20 mT. Alternate layers of Co and Pt were deposited onto a substrate spinning over the Co and Pt targets. The thickness of each layer was controlled by controlling the deposition rate and the substrate rotation speed. The thickness of Co and Pt were 0.2-0.8 and 0.4-1.8 nm respectively and the number of bilayers was 5-23. A pair of adjacent layers of Pt and Co is referred to as a bilayer.

Several test samples were prepared by depositing the Co/Pt multilayers without and with seed layers on small test samples of glass and polycarbonate (PC) substrates. Structures were also deposited on the 5.25 dia. glass and PC substrates.

As shown in FIG. 3, the perpendicular Kerr hysteresis loops were measured at 780 nm wavelength to obtain coercivity (Hc) and the Kerr rotation ($\theta k$) of the structures. The dynamic measurements of the MO structures were made under the following conditions: 5.6-7 m/sec disk velocity, 1 MHz carrier frequency, 33-50% duty cycle, 30 kHz bandwidth, 300 Oe bias field, 0-10 mW write power and 1.5-2.0 mw read power.

Figure 3A:
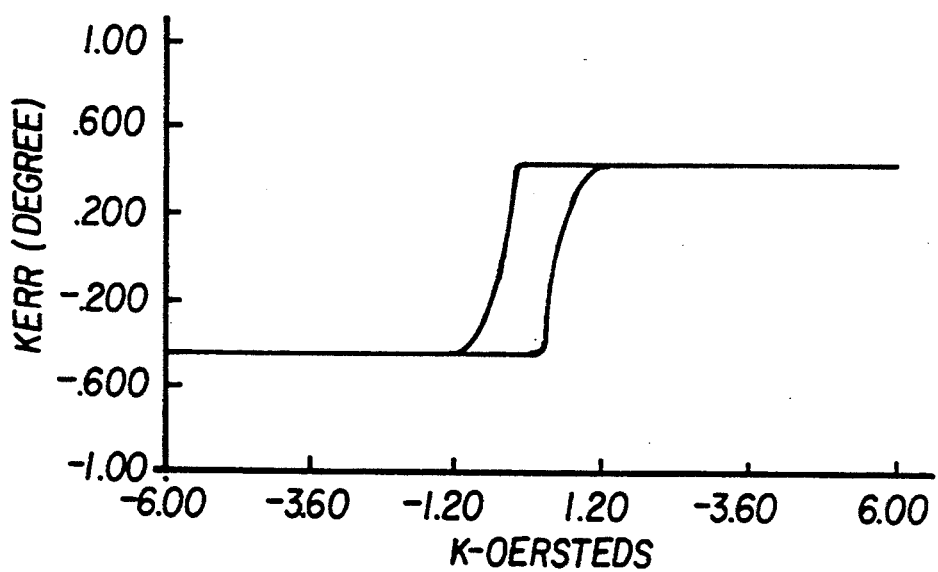
FIGS. 3A-F show a series of plots of Kerr hysteresis loops with different thicknesses of zinc-tin-oxide.

In FIG. 3A, the first drawing shows a Kerr hysteresis loop without a seed layer. The remaining show Kerr hysteresis loops of different thicknesses of $Zn_{0.50}Sn_{0.50}O_{1.50}$.

A Co/Pt multilayer structure with twelve bilayers was deposited on a 5.25" dia. glass substrate. The thickness of the individual Co and Pt layers were 0.25 nm and 0.8 nm respectively. FIG. 3A shows the plot of Kerr rotation (degree) versus magnetic field for the structure without a seed layer. Coercivity and the Kerr rotation were 421 Oe and 0.45 degree respectively.

Figure 3B:
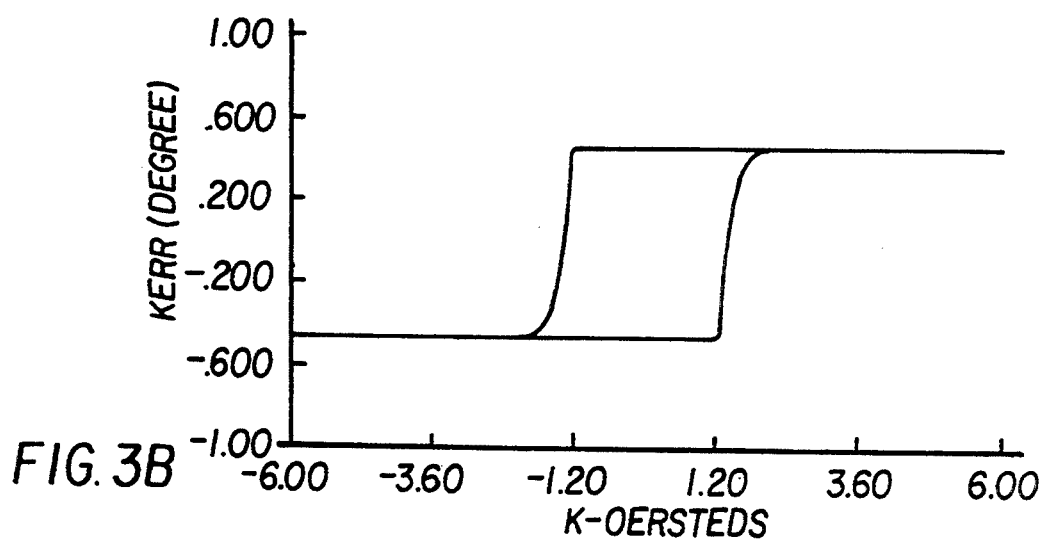

Another disk was prepared under the same conditions first by depositing a 1 nm seed layer of $Zn_{0.50}Sn_{0.50}O_{1.50}$ and then the twelve bilayers of the same composition Co/Pt multilayer structure. The Kerr loop of this structure is shown in FIG. 3B. Surprisingly, the Co/Pt multilayer structure deposited on $Zn_{0.50}Sn_{0.50}O_{1.50}$ seed layer has substantially larger coercivity than that sputtered directly on the substrate. Also the squareness of the Kerr loop is tremendously improved. This improvement in the squareness of the Kerr loop reduces the writing noise during recording.

Figure 3C:
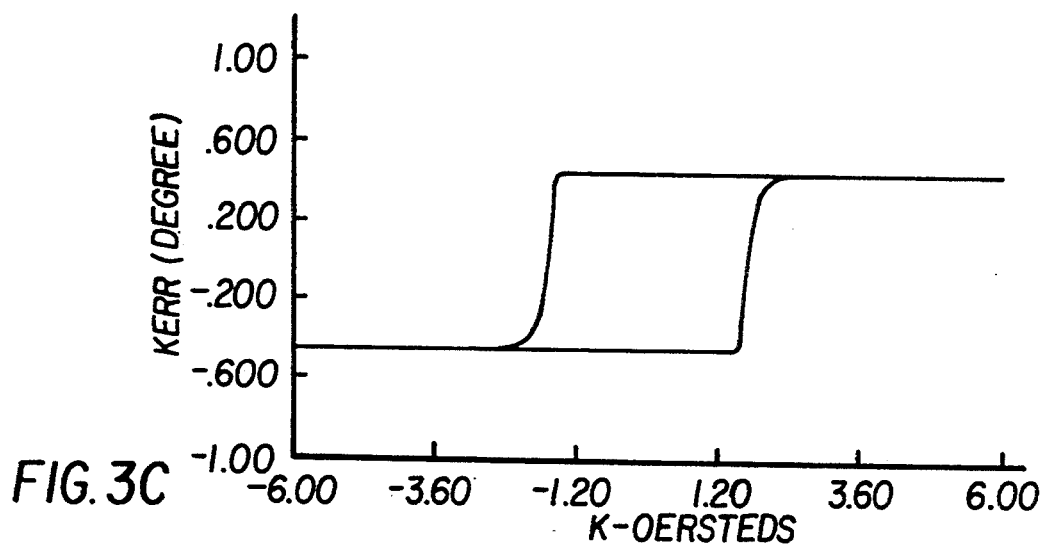
Figure 3D:
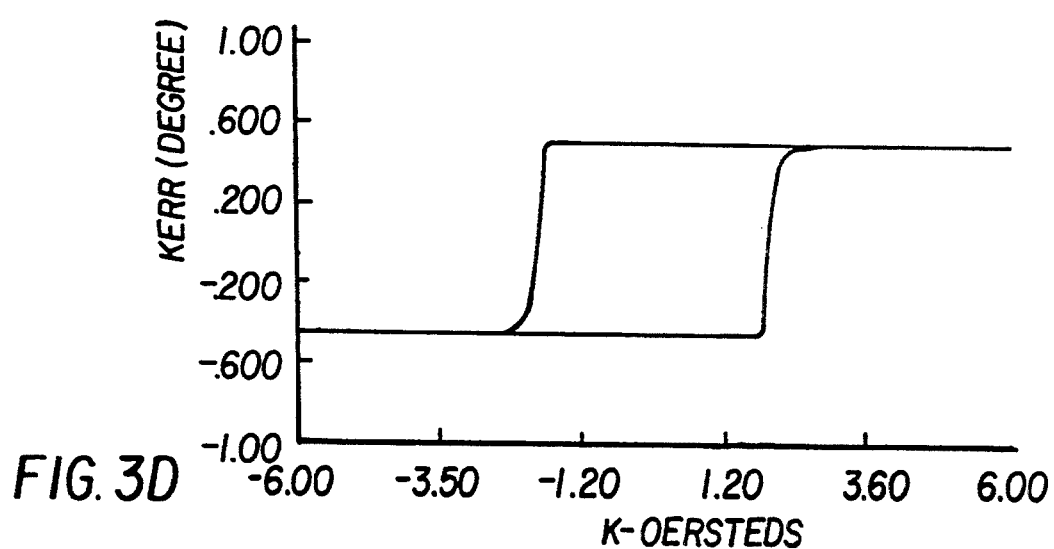
Figure 3E:
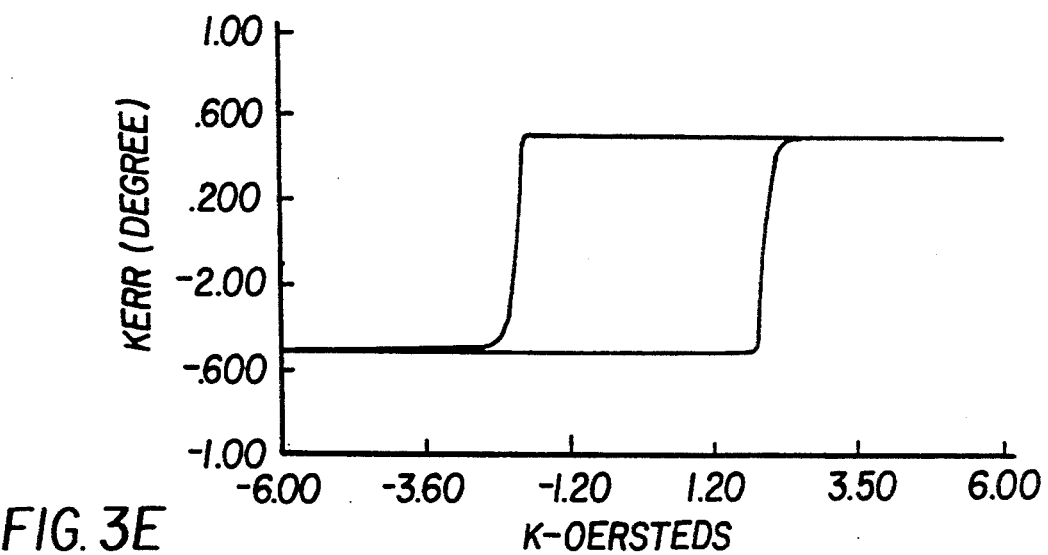
Figure 3F:
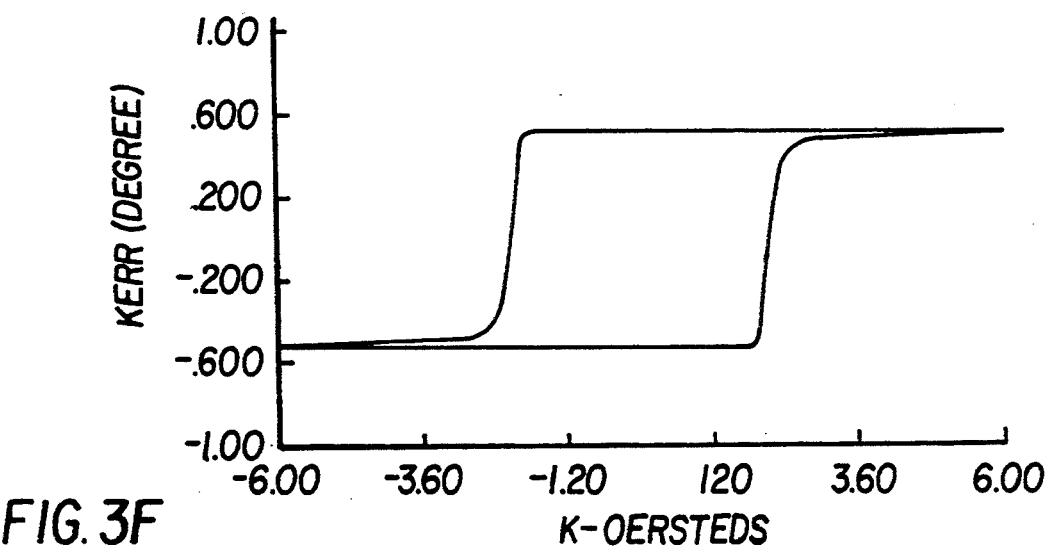

The Kerr loops of the Co/Pt multilayer structures deposited on varying thicknesses of the $Zn_{0.50}Sn_{0.50}O_{1.50}$, as illustrated in FIGS. 3b-f, seed layers were measured. It was found that very thin layers of zinc-tin-oxide (less than 20 nm) increases the coercivity of the Co/Pt multilayer significantly and improves the squareness of the Kerr loop dramatically. As the thickness of the seed layer increases, both coercivity and Kerr rotation increase monotonically. More specifically with reference to the drawings, the thicknesses of the seed layer are illustrated: FIG. 3A—0 nm; FIG. 3B—1 nm; FIG. 3C—2 nm; FIG. 3C—5 nm; FIG. 3E—10 nm; and FIG. 3F—20 nm. FIG. 3A is a plot of a prior art structure. It is quite evident that the coercivity with these structures increases with seed layer thickness, and that is a highly desirable feature.

Figure 4:
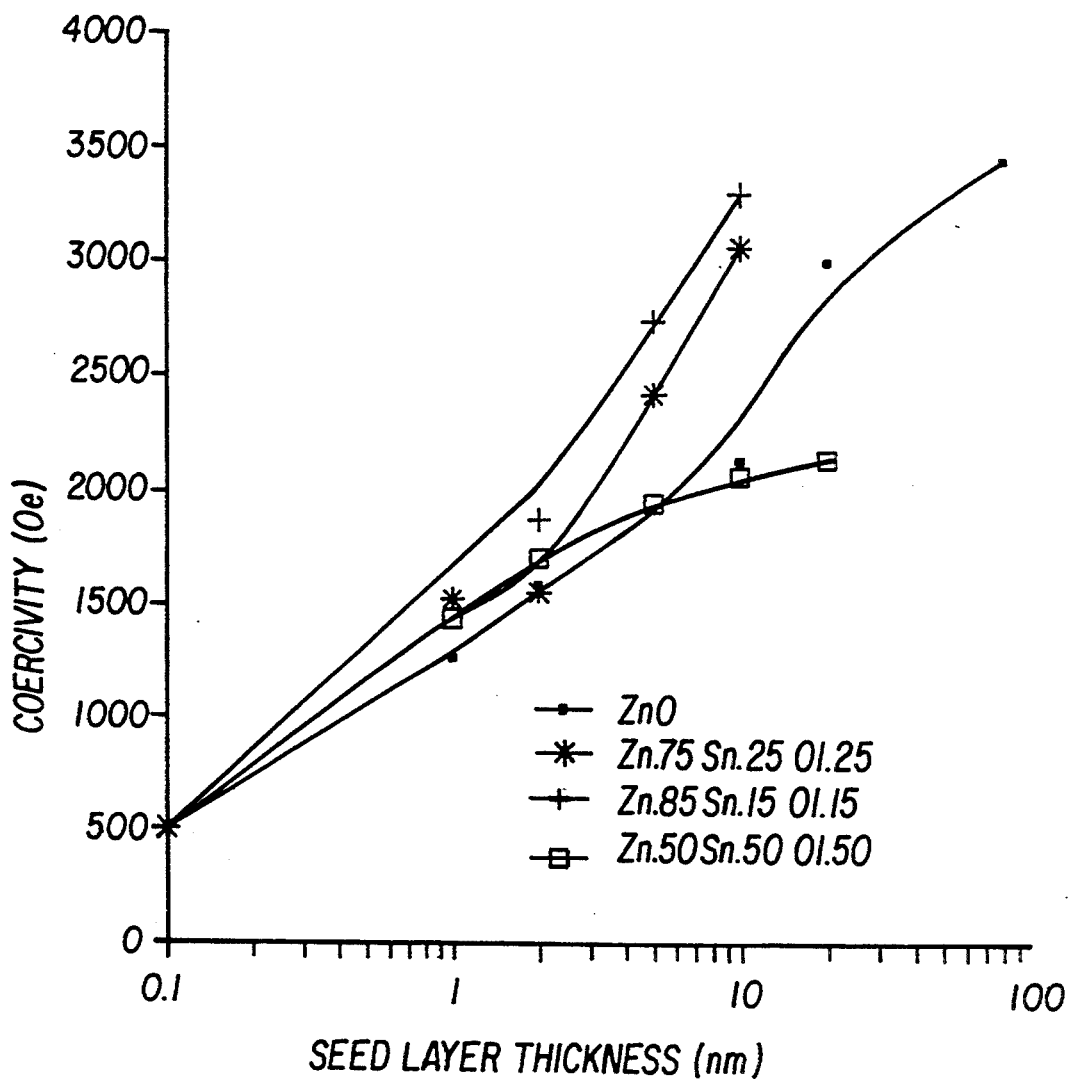
FIG. 4 is a plot showing comparisons of coercivities using ZnO and $(Zn)_{1-x}(Sn)_x(O)_{1+x}$ seed layers.

FIG. 4 shows a comparison of coercivities of different materials, the advantages of using compositions of zinc-tin-oxide as they have increased coercivity and these structures are also amorphous which provide advantages listed above.

Several full structure disks were prepared by depositing Co/Pt multilayer with or without thin seed layers on 5.25" dia. polycarbonate and glass substrates. These disks were tested for dynamic performance. It has been determined that seed structures in accordance with this invention provide a decreased noise level as compared to crystalline zinc oxide.

The invention has been described in detail with particular reference to certain preferred embodiments thereof, but it will be understood that variations and modifications can be effected within the spirit and scope of the invention.

PARTS LIST 10 substrate 11 seed layer
12 Pt layer
14 Co layer
18 lacquer layer
20 dielectric layer
22 metal layer

We claim:

1. A magnetooptical recording medium comprising a substrate, a seed layer of amorphous $Zn_{1-x}Sn_xO_{1+x}$ wherein x=0.15 to 0.75, and a recording multilayer of alternate layers of cobalt and platinum or cobalt and palladium deposited onto the said seed layer, wherein the said seed layer is selected to improve the coercivity and squareness of the recording multilayer.

2. The magnetooptical recording medium of claim 1 further includes a UV curable lacquer overcoat provided over said multilayer.

3. The magnetooptical recording medium of claim 1 further including a dielectric layer on the recording multilayer and a metal layer provided on the dielectric layer and a UV curable lacquer overcoat provided on the metal layer.

4. The magnetooptical recording element of claim 3 wherein the thickness of dielectric layer is 0.2 nm–100 nm.

5. The magnetooptical recording medium of claim 1 further comprising a of dielectric layer deposited on the recording multilayer film.

6. The magnetooptical recording medium of claim 1 wherein said multilayer contains 5–25 bilayers of Co and Pt, and the Co and Pt thickness varies between 0.2 to 0.8 nm and 0.4 to 1.8 nm respectively.

7. The magnetooptical recording medium of claim 5 wherein said multilayer film contains 5–25 bilayers of Co and Pt, and the Co and Pt thickness varies between 0.2 to 0.8 nm and 0.4 to 1.8 nm respectively.

* * * * *